April 17, 1934.　　　C. V. JÄHLE　　　1,955,500

MOLDING MACHINE

Filed Feb. 24, 1932　　　4 Sheets-Sheet 1

C. V. Jähle
INVENTOR

By: Marks & Clerk
Attys.

April 17, 1934.   C. V. JÄHLE   1,955,500
MOLDING MACHINE
Filed Feb. 24, 1932   4 Sheets-Sheet 2

C. V. Jähle
INVENTOR

By: Marks & Clerk
Attys.

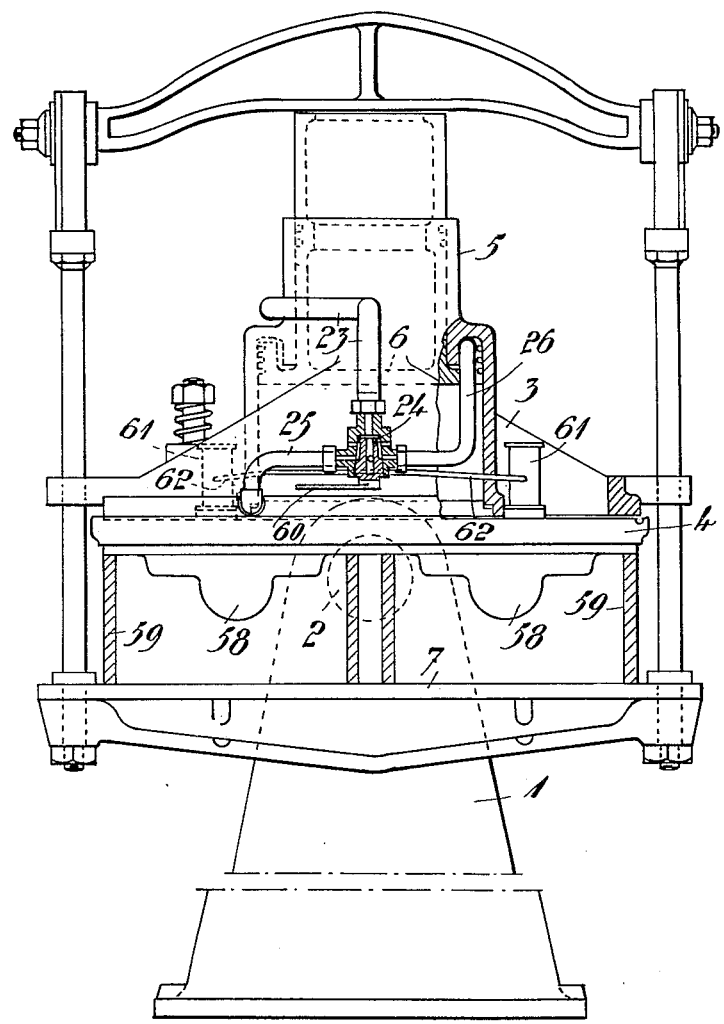

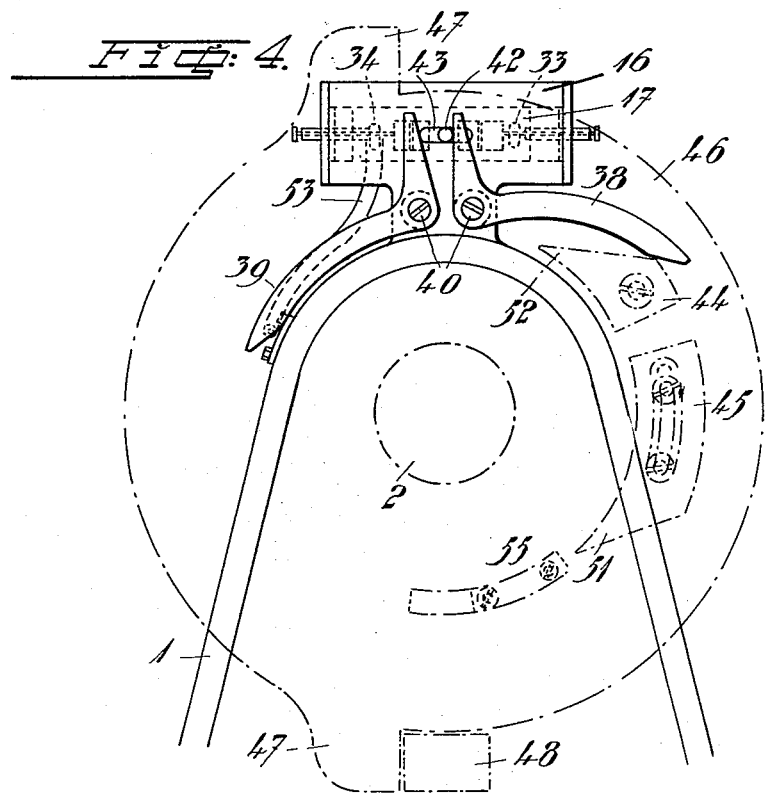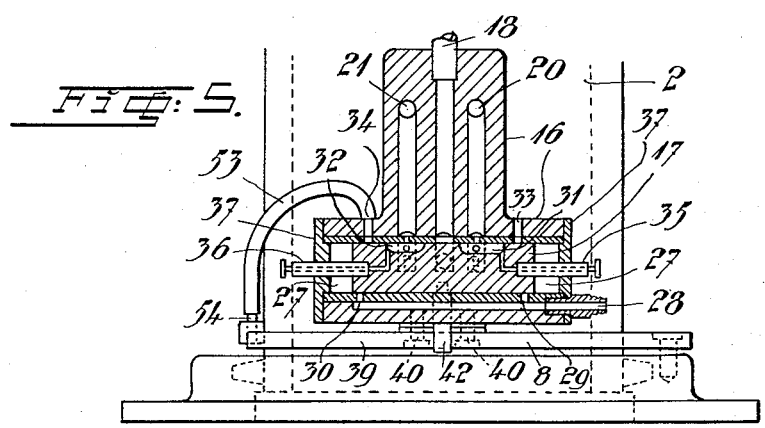

UNITED STATES PATENT OFFICE 1,955,500

MOLDING MACHINE

Carl Verner Jähle, Katrineholm, Sweden

Application February 24, 1932, Serial No. 594,870
In Sweden March 3, 1931

2 Claims. (Cl. 22—33)

The object of the present invention is in a roll-over molding machine to facilitate a very quick turning movement, for instance within the course of a second, with the use of compressed air or other gaseous medium only, without this involving any shock or sudden interruption during the turning movement. The invention also has for its purpose to facilitate the operation required for the turning movement from the most suitable place in the proximity of the machine.

The invention is substantially characterized in that the roll-over part of the machine is movably connected to a turning device operating with compressed air or other suitable gaseous pressure medium, in such a manner that the turning device is caused, through pneumatic action, not only to perform the turning movement, but also to produce a resistance to the turning masses, which resistance is preferably of a soft or slowly yielding nature during the last period of the turning movement.

The turning device thus operating with compressed air preferably comprises two pressure cylinders with reciprocating pistons connected to the roll-over part of the machine through a suitable motion-transmitting means, which latter preferably consists of a chain connected to both cylinder pistons and extending over a sprocket wheel rigidly connected with the said roll-over part. In addition, the said roll-over part of the machine is in such mechanical connection with a slide valve provided in the conduit for the compressed air that this valve will be shifted during the turning movement in such a manner as to mediate a slow escape of the compressed air, which forms the slowly yielding resistance to the turning masses.

The accompanying drawings illustrate an example of embodiment of the invention.

Fig. 3 also shows the machine in a front view, the pressing board and the flask board being turned downwardly.

Fig. 4 is a view to a larger scale of the arrangement, by means of which the roll-over part of the machine performs the shifting of the slide valve during the turning movement.

Fig. 5 is a plan view to a larger scale showing the slide valve in section.

Figure 1:
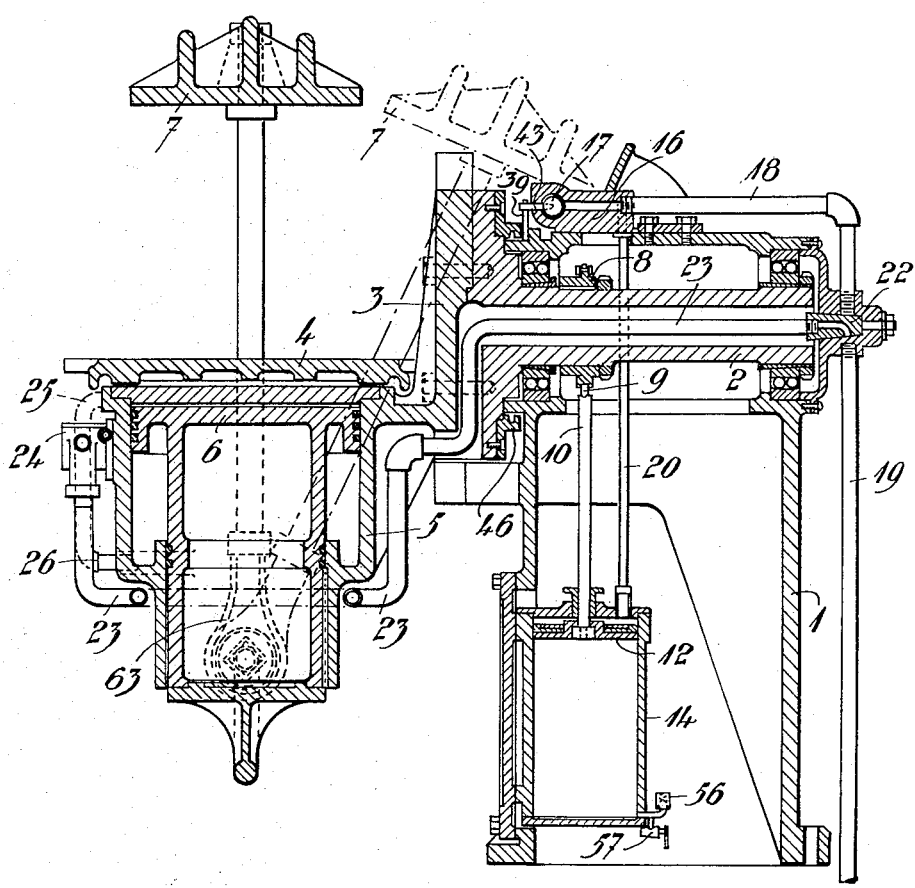
Fig. 1 shows the molding machine in elevation and in vertical section.

Rotatably mounted in the upper portion of the machine frame 1 is a horizontal spindle 2, to the front end of which is rigidly connected a part 3 carrying the flask board 4, said part 3 being integral with a pressure cylinder 5 having a reciprocating piston 6 arranged therein, said piston being connected to and actuating the pressing board 7 of the molding machine in a manner to be described more fully in the following. Secured to the spindle 2 is a sprocket wheel 8 having a chain 9 extending over the same, the two ends of the chain being connected each with a separate piston rod 10 and 11 connected to the pistons 12 and 13 respectively, which are movable up and down in the respective pressure cylinders 14 and 15. On the upper side of the frame 1 is secured the casing 16 of the slide valve 17 communicating through the conduit 18 with that conduit 19 through which the compressed air is supplied. The pressure chambers above the pistons 12 and 13 in the cylinders 14 and 15 are both in connection with the slide valve 17 through conduits 20 and 21 respectively (see Fig. 5), only the one of which 20 is shown in Fig. 1. The main conduit 19 for the compressed air is in connection with the conduit 23 through the valve cock 22, which latter is rotatable together with the spindle 2, said conduit 23 extending through the tubular spindle 2 and leading therefrom to the main valve 24 secured at the front to the outside of the pressure cylinder 5. The main valve 24 communicates through the conduits 25 and 26 with the two pressure chambers on either side of the piston 6 connected to the pressing board 7.

Figure 2:
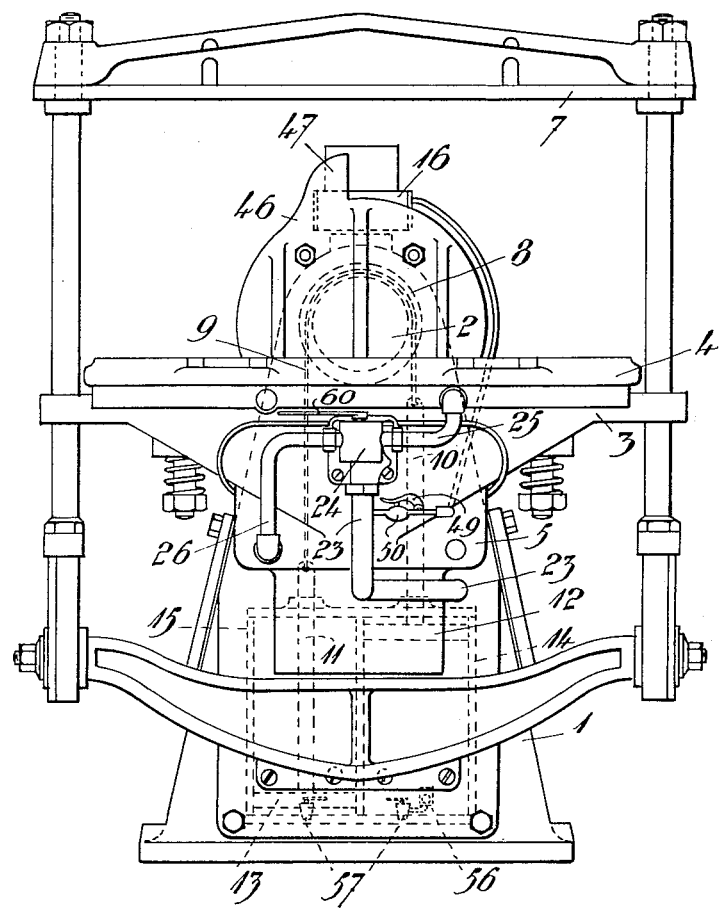
Fig. 2 is a front view of the machine, the pressing board and the flask board being turned upwardly.

The slide valve 17 is movable to and fro in the chamber 27 (see Fig. 5) within the casing 16, and the chamber 27 communicates through the conduit 28 with the conduit 23 (see Figs. 2 and 5). Through the openings 29 and 30, the conduit 28 alternately communicates with either one of the chambers 27 on both sides of the slide valve 17, in accordance with the different positions of displacement of the latter. Arranged on the conduit 28 is a valve 50 (Fig. 2) operable manually by means of a lever 49, and by means of which valve the conduit 28 may be opened.

Arranged in the cylindrical surface of the slide valve 17 are two cavities 31 and 32 separated by a whole partition and corresponding each to one of the conduits 20 and 21 respectively. Each cavity has such an extension in the longitudinal direction of the slide valve that in the extreme left position (Fig. 5) of the slide valve the cavity 31 is in connection with the conduit 18 as well as with the conduit 20, while in the extreme right position of the slide valve the cavity 32 is in connection both with the conduit 18 and with the conduit 21. Arranged in the wall of the casing 16 are two openings 33 and 34, which likewise are brought into connection alternately with the respective cavities 31 and 32, when the slide valve 17 is in either one of its extreme positions. The cavities 31 and 32 are also in connection with valves 35 and 36 in the manner shown in Fig. 5, said valves leading out through the bottoms 37 of the casing 16 and being displaceable to and fro therein.

Pivotally attached to a part integral with the casing 16 of the slide valve 17 are two bell crank levers 38 and 39 pivoted about studs 40. Between the upwardly directed arms of the bell crank levers 38, 39 enters a stud 42 movable to and fro in a longitudinal slot 43 in the wall of the casing 16. The two other arms of the bell crank levers are so situated that they may be actuated alternately by cams 44 and 45 arranged on a cam disk 46 rigidly connected with the rotatable spindle 2. At substantially diametrical points the cam disk 46 is provided with projections 47 cooperating with a fixed abutment 48 and thus limiting the rotary movement of the cam disk in both directions.

The arrangement described above operates in the following manner.

If the slide valve 17 occupy the position shown in Fig. 5 and the operator opens the valve 50 by actuating the hand lever 49 (Fig. 2), compressed air is admitted into the pressure chamber 27 shown to the right in Fig. 5, the slide valve 17 being then displaced to the left. The cavity 31 then mediates the communication between the conduit 18 and the conduit 20, and through the latter conduit compressed air enters the chamber above the piston 12 in the cylinder 14, so that the piston is depressed to exert a rotary movement on the sprocket wheel 8 through the chain 9, and thus a rotary movement on the whole of the roll-over part of the machine. When the roll-over part of the machine is thus turned, the cam disk 46 turns to the right (according to Fig. 4). Toward the last stage, about 130° from the initial position of the turning movement, the cam 45 with its oblique surface 51 hits the arcuate arm of the bell crank lever 39, which latter is then turned so that its upwardly directed arm hits the stud 42 of the slide valve 17 and shifts the valve so far to the right that the cavity 32 no longer maintains connection between the conduits 21 and 34. The air escape from the cylinder 15 is thus cut off, and above the piston 13 an air cushion is forming, which prevents the ensuing of a jar when the machine has completed the turning movement. Said air cushion escapes by degrees through the conduit 21, the cavity 32 and the cock 36. In this position (130°), the conduits 18, 31 and 20 are still in communication, so that compressed air is supplied to the cylinder 14. The machine thus continues to roll over. At 160°, the cam 45 has further displaced the stud 42 of the slide valve 17 so far to the right (Fig. 5) that the conduits 18, 31 and 20 are no longer in communication, while the machine part continues to roll over by reason of its inertia. The air cushion thus produced and escaping by degrees consequently brings about a soft ceasing of the turning movement, until the one projection 47 of the cam disk 46 has been brought into contact with the fixed abutment 48. When the slide valve was shifted by the bell crank lever 39 in the manner above described, the opening 30 (Fig. 5) was uncovered, while the opening 29 was closed. Therefore, when the operator actuates the lever 49 for the purpose of effecting another turning movement, and opens the valve 50, compressed air enters the chamber 27 to the left (according to Fig. 5), and the slide valve 17 is displaced to the right, whereby the cavity 32 mediates communication between the conduits 18 and 21, so that compressed air enters through the latter conduit on the upper side of the piston 13 in the cylinder 15 and depresses said piston 13, so that the same is caused to turn the sprocket wheel 8 and thus the whole of the roll-over part of the machine in a backward direction through the chain 9. At this return movement the cam disk 46 turns to the left (Fig. 4), and toward the last stage of the turning movement the oblique surface 52 of the cam 44 actuates the bell crank lever 48, so that the slide valve is shifted into the position shown in Fig. 5, the cycle being repeated, only with the difference that the air cushion exerting an impeding action in the last stage of the turning movement is produced within the cylinder 14, whence it is slowly pressed out through the conduit 20, the cavity 31 and the opening 35.

As a further safety means to obviate a jar in the last stage of the turning movement, a conduit 53 may be connected with the opening 34, as will be seen from Figs. 4 and 5, the outwardly open end 54 of said conduit being so situated relatively to a cam member 55 secured to the cam disk 46 that, when in the turning movement the cam disk is turned to the right (Fig. 5), the cam 55 slides before the open end of the conduit 53 to cut off the same, whereby the air escape from the cylinder 15 through the opening 34 is closed and the air is instead caused to escape slowly through the vent valve 36.

The turning cylinders 14 and 15 are each provided in their respective bottoms with a ball valve 56 and with an ordinary cock 57, through which the air quantities underneath the respective pistons 12 and 13 are pressed out when the pistons move down. Thus, by adjusting the valves 56 and the cocks 57, the turning speed may be further regulated.

The pattern or patterns 58 (Fig. 3) are placed together with the molding flask or flasks 59 on the flask board 4 when the latter is turned upwardly, as shown in Figs. 1 and 2. After the molding sand has been filled into the flask or flasks 59, compressed air is admitted into the space above the piston 6 by turning the handle 60 of the main valve 24 180°. The piston 6 is then depressed and takes the pressing board 7 along with it, which presses the sand down into the flask 59. The turning operation above described is then performed, whereby the flask or flasks 59 will be turned downwardly according to Fig. 3. The flasks 59 filled with sand are then drawn off the patterns by again turning the handle 60 of the valve 24 90° forwards. The compressed air previously admitted onto the greatest pressing surface of the piston 6 then escapes, so that the piston 6 moves downwardly from the position in Fig. 3 through the influence of vibration and its own weight as well as the weight of the pressing board 7 and the mold flask. Thereafter the said handle is further turned by 90°, compressed air being thus admitted into the space corresponding to the smallest pressing surface of the piston 6. The stripping of the pattern is thus effected by an escape of air in the first stage, and by simultaneous admission of atmospheric air in the second stage to the cylinder 5, the stripping thus taking place quite slowly, so that the pattern is separated from the flask filled with sand by a uniform sliding movement.

To render the pattern stripping easy and safe, vibrating devices operating in a manner known per se are arranged at the flask board 4, said vibrating devices being in communication with the main valve 24 through conduits 62, in such a manner that said devices are brought into action simultaneously with the shifting of the main valve 24 for the pattern stripping. The main valve 24 is so constructed that all movements for the pressing, pattern stripping and vibration take place only by manœuvring the main valve. For this reason these movements can never be confused, inasmuch as they take place automatically in succession by turning the handle 60 half a revolution, which in agreement with the turning movement is always effected in one and the same direction, namely from the left to the right according to the drawings. In other words, the movements are so related to each other that stripping of the patterns cannot take place without simultaneous vibration, while vibration cannot take place without simultaneous pattern stripping.

As will be seen from Fig. 1, the pressing board 7 is connected with the pressing piston 6 in a pendulating fashion, so that it may be rocked rearwardly, as shown by chain-dotted lines in Fig. 1, to uncover the flask board 4. Thus, the pressing board 7 need not, as is generally the case, be raised from the flask board 4 along some vertically bulky guide, whereby the advantage is obtained that the machine may be built very low and otherwise kept within small dimensions. The pendulating pressing board 7 is balanced by a spring 63 in such a manner that the board may readily be brought into its different extreme positions.

What I claim is:—

1. A quick turning molding machine comprising a frame, a mold turning spindle journaled in the frame, a pair of cylinders adjacent the spindle, pistons reciprocable in the cylinders, a flexible member connecting the pistons and having driving connection with the spindle, a valve casing on the frame, a valve slidable in the casing, means for conducting pressure fluid to the valve casing, conduits affording communication between the cylinders and valve casing, and means movable with the spindle for shifting the valve to first cut off the escape of air from the idle cylinder and subsequently to cut off the flow of air to the working cylinder.

2. A quick turning molding machine comprising a frame, a mold turning spindle journaled in the frame, a casing carried by the frame, a valve slidable in the casing and having a pin carried thereby, a pair of cylinders adjacent the spindle, pistons reciprocable in the cylinders, a sprocket fixed to the spindle, a chain engaged with the sprocket and having its ends connected with the rods of the pistons, conduits affording communication between the valve casing and cylinders, bell crank levers on the valve casing, means for conducting pressure fluid to the valve casing, a disc rotatable with the spindle and having cams thereon engageable with the bell cranks for actuating the same to shift the pin and thus the valve to first cut off the escape of air from the idle cylinder and subsequently to cut off the flow of air to the working cylinder.

CARL VERNER JÄHLE.